US012682693B2

(12) United States Patent
Rittler et al.

(10) Patent No.: US 12,682,693 B2
(45) Date of Patent: Jul. 14, 2026

(54) VEHICLE SYSTEM FOR A VEHICLE AND ASSOCIATED METHOD FOR OPERATING THE VEHICLE SYSTEM

(71) Applicant: Robert Bosch GmbH, Stuttgart (DE)

(72) Inventors: Stephan Rittler, Urbach (DE); Sven Loeffler, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 3 days.

(21) Appl. No.: 18/997,417

(22) PCT Filed: Jul. 12, 2023

(86) PCT No.: PCT/EP2023/069252
§ 371 (c)(1),
(2) Date: Jan. 21, 2025

(87) PCT Pub. No.: WO2024/041804
PCT Pub. Date: Feb. 29, 2024

(65) Prior Publication Data
US 2026/0024382 A1 Jan. 22, 2026

(30) Foreign Application Priority Data
Aug. 25, 2022 (DE) ..................... 10 2022 208 816.6

(51) Int. Cl.
G07C 5/00 (2006.01)
B60C 23/04 (2006.01)
G07C 5/02 (2006.01)

(52) U.S. Cl.
CPC .......... G07C 5/008 (2013.01); B60C 23/0479 (2013.01); B60C 23/0488 (2013.01); G07C 5/02 (2013.01)

(58) Field of Classification Search
CPC ...... G07C 5/008; G07C 5/02; G07C 9/00309; B60C 23/0479; B60C 23/0488; B60C 23/0444
See application file for complete search history.

(56) References Cited

U.S. PATENT DOCUMENTS 6,034,597 A * 3/2000 Normann ............ B60C 23/0416
340/447
7,113,084 B2 * 9/2006 Huang ................ B60C 23/0444
73/146

(Continued)

FOREIGN PATENT DOCUMENTS

DE 102013224330 A1 7/2014
WO 2021171351 A1 9/2021

OTHER PUBLICATIONS

International Search Report for PCT/EP2023/069252, Issued Oct. 11, 2023.

*Primary Examiner* — Richard M Camby
(74) *Attorney, Agent, or Firm* — NORTON ROSE FULBRIGHT US LLP

(57) ABSTRACT

A vehicle system for a vehicle. The vehicle system includes: a plurality of communication nodes, wherein each of the communication nodes is able to provide a connection to a plurality of mobile communication units. The vehicle system is configured to detect whether the vehicle is in a first operating state or a second operating state and, in response to detecting that the vehicle is in the second operating state, control a portion of the communication nodes such that each communication node belonging to the portion of communication nodes provides a reduced number of possible connections to the mobile communication units than in the first operating state, and is configured to detect a radio signal emitted by a tire condition sensor with which the availability of the tire condition sensor is announced and, upon detection (Continued)

of the radio signal, establish a communication connection to the tire condition sensor.

10 Claims, 2 Drawing Sheets

(56)                References Cited

U.S. PATENT DOCUMENTS

| | | | |
|---|---|---|---|
| 9,067,466 B2 * | 6/2015 | Patterson | ............ B60C 23/0437 |
| 2002/0140574 A1 * | 10/2002 | Starkey | .............. B60C 23/0461 |
| | | | 340/870.16 |
| 2004/0130442 A1 * | 7/2004 | Breed | .................. G06V 20/593 |
| | | | 340/449 |
| 2006/0180371 A1 * | 8/2006 | Breed | .................... G07C 5/008 |
| | | | 180/197 |
| 2009/0002146 A1 * | 1/2009 | Lin | ..................... B60C 23/0437 |
| | | | 340/447 |
| 2012/0223828 A1 * | 9/2012 | Amato | ............... B60C 23/0433 |
| | | | 340/447 |

* cited by examiner

VEHICLE SYSTEM FOR A VEHICLE AND ASSOCIATED METHOD FOR OPERATING THE VEHICLE SYSTEM

FIELD

The present invention relates to a vehicle system for a vehicle.

BACKGROUND INFORMATION

In current vehicle systems, a tire pressure of one tire or all tires is communicated to the vehicle by a tire pressure sensor via conventional radio interfaces. This information is received and evaluated by a control unit (ICU) in the vehicle.

In new tire pressure monitoring systems (TPMS), the information from the tire pressure sensor is sent to the vehicle via Bluetooth Low Energy. To enable communication between a tire pressure sensor and the electronics of a vehicle, one or more Bluetooth receivers are needed in the vehicle. In this case, however, it is desirable that these Bluetooth transmitters/receivers can also be used for other purposes, for example to enable communication with other mobile communication units.

SUMMARY

A vehicle system according to an example embodiment of the present invention for a vehicle comprises a plurality of communication nodes, wherein each of the communication nodes is able to provide a connection to a plurality of mobile communication units. The vehicle system is designed to detect whether the vehicle is in a first operating state or a second operating state and, in response to detecting that the vehicle is in the second operating state, control a portion of the communication nodes such that each communication node belonging to said portion of communication nodes provides a reduced number of possible connections to the mobile communication units than in the first operating state, and is configured to detect a radio signal emitted by a tire condition sensor with which the availability of the tire condition sensor is announced and, upon detection of the radio signal, establish a communication connection to the tire condition sensor.

The method according to an example embodiment of the present invention for operating a vehicle system for a vehicle which comprises a plurality of communication nodes, wherein each of the communication nodes is able to provide a connection to a plurality of mobile communication units, comprises detecting whether the vehicle is in a first operating state or a second operating state, and, in response to detecting that the vehicle is in the second operating state, controlling a portion of the communication nodes such that each communication node belonging to said portion of communication nodes provides a reduced number of possible connections to the mobile communication units than in the first operating state, and is configured to detect a radio signal emitted by a tire condition sensor with which the availability of the tire condition sensor is announced and, upon detection of the radio signal, establish a communication connection to the tire condition sensor.

The tire condition sensor provides any information that is acquired on a wheel or tire of the vehicle; for example tire pressure, tire temperature, battery status of the sensor, internal data of the sensor, acceleration and/or wear of the tire. The tire condition sensor is in particular a tire pressure sensor. The communication nodes are preferably designed to provide the connection to the plurality of mobile communication units via a Bluetooth connection, in particular a Bluetooth Low Energy connection. The radio signal emitted by the tire condition sensor is also preferably a Bluetooth signal which can be received and processed by the communication nodes.

According to an example embodiment of the present invention, the mobile communication units are in particular mobile telephones or other portable units which can be used, for example, to unlock the vehicle. The connection between one or more of the communication nodes and one of the mobile communication units thus preferably enables a function of the vehicle to be controlled via the mobile communication unit.

For technical reasons, each communication node can provide only a limited number of connections to a maximum number of mobile communication units. For each connection between one of the communication nodes and a mobile communication unit connected to these communication nodes, for instance, a time slot has to be provided in which the communication between said units can take place. The more mobile communication units are connected to one of the communication nodes, the more time slots are needed for communication with the different mobile communication units. Likewise, a time slot is needed for communication between the tire condition sensor and one of the communication nodes. This can result in a variety of problems. It may be, for example, that a tire condition sensor is not able to connect to one of the communication nodes because it has no free time slots for this communication. To ensure that the tire condition sensor can connect to one of the communication nodes when needed, the system detects whether the vehicle is in a first operating state or a second operating state. The second operating state is in particular an operating state in which the information from the tire condition sensor is needed. The first operating state is in particular an operating state in which the information from the tire condition sensor is not needed or cannot be provided.

In the second operating state, the system determines for a portion of the communication nodes that the number of possible connections to mobile communication units is reduced for these communication nodes. The portion of communication nodes is a subset of all available communication nodes. This opens up free time slots for the respective communication node for which the number of possible connections to mobile communication units has been reduced, which enable communication with the tire condition sensor.

The portion of communication nodes that is controlled to provide a reduced number of possible connections to mobile communication units compared to the first operating state in particular comprises exactly one communication node.

According to an example embodiment of the present invention, to provide a connection to a mobile communication unit, the respective communication node has to emit a so-called advertising signal. The advertising signal is a signal by means of which the availability of the respective communication node is indicated. For this purpose, the respective communication node is operated in an operating mode which is also referred to as advertising mode. The signal emitted by the respective communication node can be received by a mobile communication unit, which can then request and establish a connection to the emitting communication node. During a period of time in which a communication node is communicating with a mobile communication unit, it is operated in a so-called "connected mode", in which data is exchanged between the respective communication node and the connected mobile communication unit.

According to an example embodiment of the present invention, the tire condition sensor also emits a radio signal, which indicates the availability of the tire condition sensor. This announces the availability of the tire condition sensor. This radio signal has to be received by one of the communication nodes so that it can initiate the establishment of a connection to the tire condition sensor. The respective communication node is typically operated in a scanning mode, in which it detects whether a radio signal emitted by the tire condition sensor is present, with which the availability of the tire condition sensor is announced. If such a radio signal is detected, the communication link to the tire condition sensor is established by the respective communication node.

According to an example embodiment of the present invention, in the second operating state, on the other hand, not all of the communication nodes are operated in scanning mode; instead only a portion of the communication nodes is controlled to detect the radio signal emitted by the tire condition sensor. The remaining communication nodes, which do not belong to the portion of communication nodes, can thus provide the full capacity for providing connections to mobile communication units. For the communication nodes from the portion of communication nodes, however, the number of possible connections to mobile communication units is reduced. Consequently, fewer mobile communication units can be connected to the respective communication node than is the case in the first operating state. Possible connections to mobile communication units are theoretically possible connections. In the second operating state, for example, a number of N possible connections are provided by a communication node from the portion of communication nodes. Therefore, a maximum of N mobile communication units can connect to these communication nodes. However, this does not necessarily mean that N mobile communication units are always connected to these communication nodes, because it may not necessarily be the case that a number of N mobile communication nodes have requested a connection to the vehicle or that these communication units are already connected to another one of the communication nodes.

The portion of communication nodes is thus used to select a single communication node or group of communication nodes through which a communication link to the tire condition sensor can be established. The rest of the communication nodes are preferably not designed to detect the radio signal emitted by the tire condition sensor in regular operation and establish a communication link to it.

The portion of communication nodes is preferably configured to detect the radio signal emitted by multiple tire condition sensors and establish a communication link to each of these tire condition sensors.

The reduced number of possible connections to the mobile communication units is greater than 0.

Preferred further developments of the present invention are disclosed herein.

According to an example embodiment of the present invention, the vehicle system is preferably further designed, in response to detecting that the vehicle is in the first operating state, to control all of the communication nodes to allow a respective predefined number of possible connection to the mobile communication units. The predefined number of possible connections is preferably the same for all of the plurality of communication nodes. Thus, if the system detects that the vehicle is in the first operating state, the not reduced number of possible connections is provided by the portion of communication nodes. Optionally, if the first operating state is detected, a communication link to the tire condition sensor is broken. This ensures that a maximum number of mobile communication units can be coupled to the vehicle system in the first operating state. This number can be reduced in the second operating state, if this is not offset by communication nodes that do not belong to the portion of communication nodes.

According to an example embodiment of the present invention, the vehicle system is preferably designed such that, in the first operating state, the radio signal of the tire condition sensors is rejected or ignored by all communication nodes. In particular, this means that none of the communication nodes are operated in scanning mode in the first operating state. Therefore, no resources are held in reserve for detecting the radio signal emitted by the tire condition sensors.

According to an example embodiment of the present invention, the vehicle system is further preferably also configured such that, in the second operating state, the radio signal of the tire condition sensor is rejected or ignored by the communication nodes that do not belong to the portion of communication nodes. In particular, this means that the communication nodes that do not belong to the portion of communication nodes are not operated in scanning mode.

According to an example embodiment of the present invention, it is also advantageous if the portion of communication nodes comprises exactly one communication node. The result of this is that a connection to the tire condition sensor or multiple tire condition sensors is always established via the same communication node. The result of this is that the resources of this communication node can be optimized for the expected number of connections to multiple tire condition sensors. It is generally known that exactly four tire condition sensors will establish a connection to this communication node. If the portion of communication nodes comprises multiple communication nodes, a radio signal between the respective communication node and the tire condition sensor connecting to it can be optimized, but it is not necessarily known how many of the tire condition sensors are connecting to a specific communication node.

According to an example embodiment of the present invention, it is also advantageous if the radio signal emitted by the tire condition sensor is a radio signal emitted in a periodic interval having a first cycle duration, and/or if an established connection between one of the communication nodes from the portion of communication nodes and the mobile communication unit connected to the respective communication node is carried out in a periodic interval having a second cycle duration. Because the radio signal is emitted by the tire condition sensor in the periodic interval, the communication node is repeatedly given the opportunity to detect said signal and, in response, establish a communication link to the tire condition sensor. Because the established connection between a communication node from the portion of communication nodes and the mobile communication unit connected to those communication nodes is carried out in a periodic interval, different time intervals can be assigned to different mobile communication units and thus communication with each one of the mobile communication units is made possible over a period of time. This could also be considered time multiplexing.

The first cycle duration is preferably not equal to the second cycle duration. The portion of communication nodes does not necessarily know at what point in time the radio signal is emitted by the tire condition sensor. Thus, it could be that the signal is always emitted by the tire condition sensor right when communication with one of the mobile communication units is taking place. Because the first cycle duration is not equal to the second cycle duration, however, communication with the mobile communication unit in a subsequent cycle, i.e. in a later periodic interval, does not take place at the same time as the emission of the radio signal by the tire condition sensor. This ensures that communication to the tire condition sensor is not consistently overlaid by a communication to a mobile communication unit.

The first operating state is preferably present when the vehicle is parked. The second operating state is preferably present when the vehicle is driving. Some tire condition sensors are only able to provide a measurement signal when the vehicle is being driven; i.e. is not parked. There is therefore also no need to establish communication to the tire condition sensor when the vehicle is parked. On the other hand, requests are typically sent to the vehicle system by mobile communication units when the vehicle is parked. This is the case, for example, if the vehicle is to be unlocked by a mobile communication unit. There may also be a particularly high number of mobile communication units if communication with mobile communication units that are not registered for the vehicle is permitted as well. The vehicle is in particular parked if it has not been started.

The reduced number of possible connections to the mobile communication units provided in the second operating state is further preferably a number of exactly two possible connections. This is advantageous in particular when the communication nodes establish communication via Bluetooth Low Energy (BLE). In the context of this system, it has been shown that, especially with the number of exactly two possible connections, unrestricted communication to four tire condition sensors can be implemented particularly quickly.

BRIEF DESCRIPTION OF THE DRAWINGS

Embodiment examples of the present invention are described in detail in the following with reference to the figures.

DETAILED DESCRIPTION OF EXAMPLE EMBODIMENTS

Figure 1:
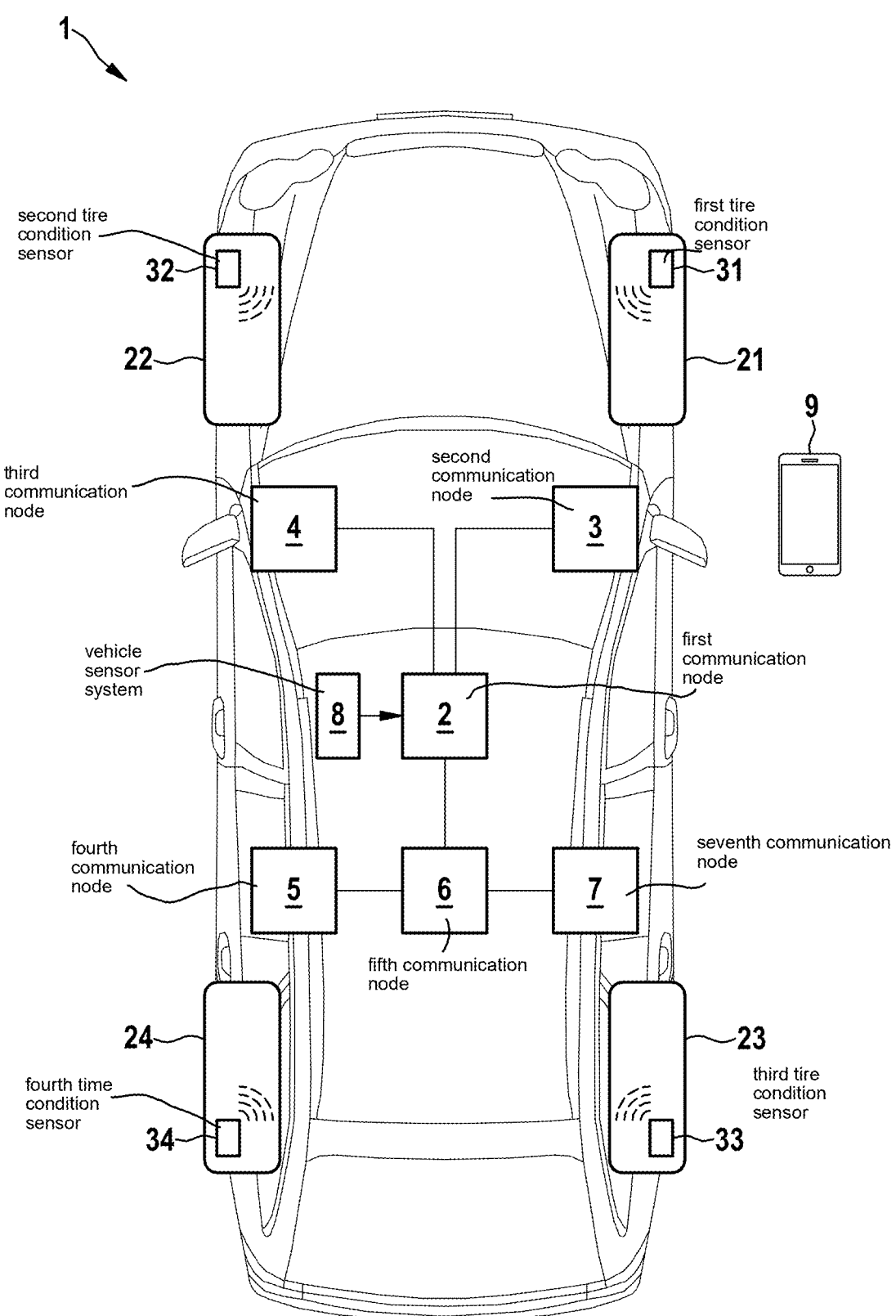
FIG. 1 shows an illustration of a vehicle with a vehicle system according to an example embodiment of the present invention

FIG. 1 shows a vehicle 1 comprising a vehicle system according to the present invention for the vehicle 1. The vehicle system carries out the method according to the present invention.

The vehicle 1 comprises a plurality of communication nodes 2, 3, 4, 5, 6, 7. Each of the communication nodes 2 to 7 is equipped with a BLE module, i.e. a Bluetooth Low Energy module, which enables the respective communication node to provide a connection to a plurality of mobile communication units 9. An example first mobile communication unit 9 is shown in FIG. 1 in the form of a smartphone.

The communication nodes 2 to 7 comprise a first communication node 2, a communication node 3, a third communication node 4, a fourth communication node 5, a fifth communication node 6 and a seventh communication node 7. The first communication node in this embodiment example is a master, with which the operation of the vehicle system and the functionality of the other communication nodes 3 to 7 are controlled. The first communication node 2 is coupled to a vehicle sensor system 8 in order to obtain information about an operating state of the vehicle 1 from it.

Each of the communication nodes 2 to 7 is able to provide a connection to the first mobile communication unit 9. The first mobile communication unit 9 connects to one of the communication nodes 2 to 7, which in turn are coupled to one another. For instance, information received by one of the communication nodes 2 to 7 from the first mobile communication unit 9 can be passed to another vehicle system via the first communication node 2 and thus request a specific vehicle function. The mobile communication unit 9 can request unlocking of the vehicle 1, for example. The example in FIG. 1 shows only a single mobile communication unit 9. However, it is possible for there to be multiple mobile communication units in the vicinity of the vehicle 1 that connect to different communication nodes 2 to 7.

The vehicle 1 comprises four tires 21 to 24. The vehicle 1 therefore comprises a front right tire 21, a front left tire 22, a rear right tire 23 and a rear left tire 24. Each of tires 21 to 24 comprises a tire condition sensor 31 to 34. Thus, a first tire condition sensor 31 is disposed on the front right tire 21, a second tire condition sensor 32 is disposed on the front left tire 22, a third tire condition sensor 33 is disposed on the rear right tire 23, and a fourth tire condition sensor 34 is disposed on the rear left tire 24. The tire condition sensors 31 to 34 measure the tire pressure of the respective associated tire, for example.

The tire condition sensors 31 to 34 also each comprise a Bluetooth Low Energy module in order to communicate with the other systems of the vehicle 1. This involves establishing communication between the tire condition sensors 31 to 34 and the communication nodes 2 to 7. As described in the following, communication in the example shown here is established exclusively via a radio link to the first communication node 2.

The vehicle system is designed to detect whether the vehicle 1 is in a first operating state or a second operating state. This is achieved by means of the first communication node 2, for example, which receives information about the current operating state of the vehicle 1 from the vehicle sensor system 8. The first communication node 2 detects that the vehicle 1 is in a first operating state when it is parked. The second operating state is present when the vehicle sensor system 8 indicates that the vehicle 1 is driving. The second operating state is present in particular when a speed of the wheels of the vehicle 1 is greater than 0 revolutions per minute, the engine has started, the doors of the vehicle 1 are closed and a driver has been detected in the driver seat of the vehicle 1. If these conditions are not met, the first operating state is present. It should be noted, however, that it is also possible to use other combinations of sensor data to detect the first or the second operating state.

Figure 2:
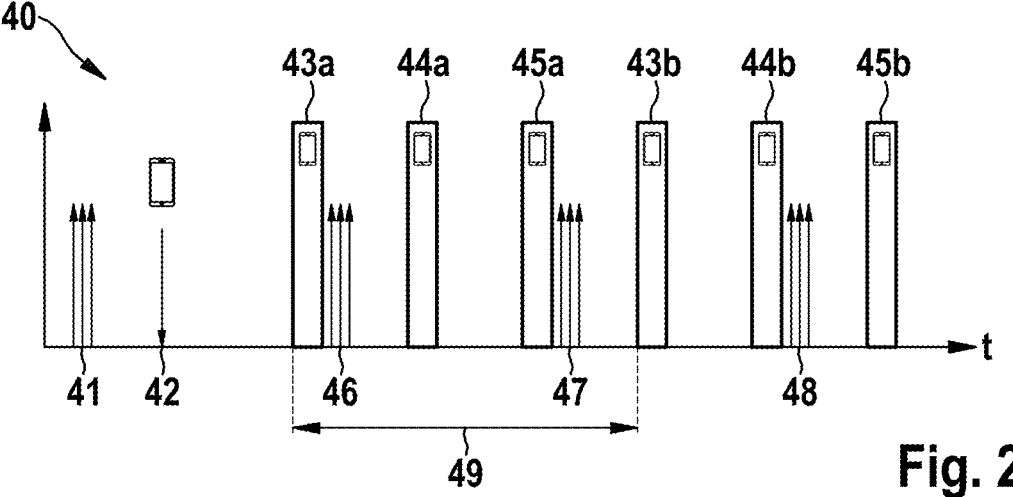
FIG. 2 shows a first diagram showing an example communication between a communication node and a plurality of mobile communication units, according to the present invention.

The vehicle 1 is assumed to be in the first operating state. FIG. 2 shows an example of a communication of the first communication node 2 in a first diagram 40. The first communication node 2 is initially operated in an advertising mode and emits an availability signal 41. This signal can be received by mobile communication units, for example the first mobile communication unit 9. This communicates to the mobile communication unit receiving the availability signal 41 that there is a possibility to connect to the vehicle system via the first communication node 2.

A connection to the first communication node 2 can be requested by a mobile communication unit through which the availability signal 41 has been received. Such a request is shown in FIG. 2 as an example request 42. In the scenario shown in FIG. 2, a plurality of mobile communication units are connected to the first communication node 2, wherein the mobile communication units communicate with the first communication node 2 in periodic intervals. The first communication node 2 communicates with the first mobile communication unit 9 in a first time interval 43*a* and a fourth time interval 43*b*. The communication node 2 also communicates with a second mobile communication unit in a second communication interval 44*a* and in a fifth communication interval 44*b*. The first communication node 2 further communicates with a third mobile communication unit in a third communication interval 45*a* and a sixth communication interval 45*b*. It can be seen that the respective established connection between the first communication node 2 and the respective mobile communication unit is carried out in periodic intervals. The periodic interval has a constant cycle duration 49, which is the same for all of the mobile communication units. Communication between the first communication node 2 and different mobile communication units is therefore carried out over a period of time. In addition, an availability signal is repeatedly emitted by the first communication node 2 at further time intervals 46, 47, 48 in order to indicate the availability of the second communication node 2 to other mobile communication units an.

The first communication node 2 can only communicate, i.e. establish a connection, with a limited number of mobile communication units. The reason for this is that a periodically repeated communication interval has to be provided for each connected mobile communication unit. The free time periods shown in the first diagram 40 would be filled by connections with other mobile communication units, for instance. A number of possible connections is therefore predefined for each of communication nodes 2 to 7, which describes to how many mobile communication units a connection can be established. For the first operating state, this number can be selected such that as many communication units as possible can be connected to a communication node 2 to 7. This applies to all of the communication nodes 2 to 7 in the first operating state.

The example communication described with the first diagram 40 was described in the context of the first communication node 2. However, since all of the communication nodes 2 to 7 act the same way in the first operating mode, the first diagram 40 also serves as an example for the other communication nodes 3 to 7.

Figure 3:
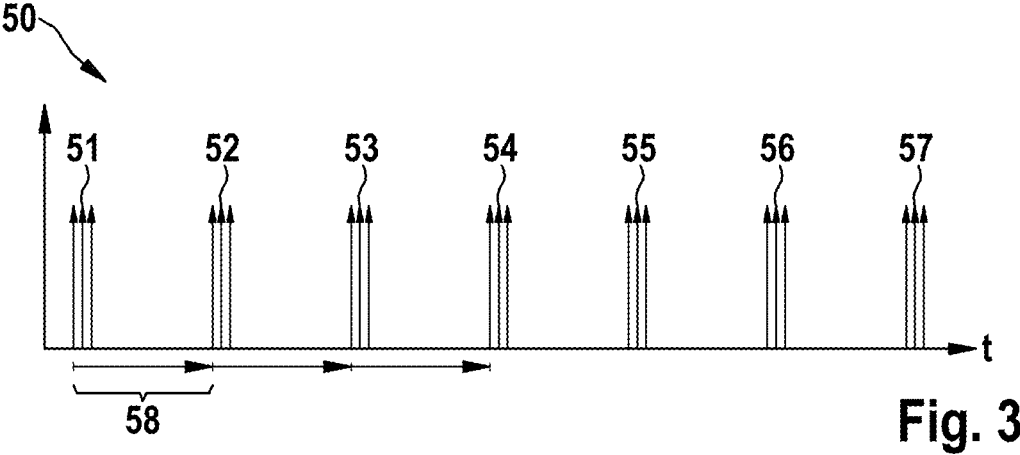
FIG. 3 shows a second diagram showing an examples of radio signal emitted by a tire condition sensor with which the availability of the tire condition sensor is announced, according to the present invention.

FIG. 3 shows a second diagram 50 that shows an example signal emitted by one of tire condition sensors 31 to 34. Each of the tire condition sensors 31 to 34 emits a radio signal 51 with which the availability of the respective tire condition sensor 31 to 34 is announced. Each of the tire condition sensors 31 to 34 thus indicates that it is available. FIG. 3 shows that a first radio signal 51 is emitted, for instance, which indicates the availability of the respective tire condition sensor 31 to 34. The first radio signal 51 emitted again after a first cycle duration 58, which is shown in FIG. 3 by the second radio signal 52. The first radio signal 51 is emitted periodically with a constant first cycle duration 58, which results in the third to seventh radio signal 53 to 57.

In order for the first radio signal or a periodic repetition of the first radio signal 51 to be received by one of the communication nodes 2 to 7, it is necessary for the respective communication node to be in a scanning mode. This means that the respective communication node 2 to 7 is not blocked by a communication with a mobile communication unit and is not being blocked because it is emitting an availability signal 41, 46, 47, 48. If the objective were that the tire condition sensors 31 to 34 establish a communication link in the first operating state, this might not be possible, because the time intervals in which the communication nodes 2 to 7 are available and in scanning mode are very short. Even if certain time intervals are available in which the communication nodes 2 to 7 are in scanning mode, it could be that the times at which the availability of tire condition sensors 31 to 34 is announced, i.e. the times at which the radio signal 51 is emitted, do not fall within these time intervals in which the communication nodes 2 to 7 are trying to detect the radio signal 51. This problem is solved in that, in response to detecting that the vehicle 1 is in the second operating state, a portion of the communication nodes 2 is controlled such that each communication node belonging to the portion of the communication nodes 2 to 7 provides a reduced number of possible connections to the mobile communication units 9 than in the first operating state. The portion of communication nodes 2 that provides a reduced number of possible connections to the mobile communication units 9 is defined by the first communication node 2. This means that the operation of the second to sixth communication nodes 3 to 7 in the first operating state and the second operating state is unchanged. The first communication node 2, however, is controlled such that it provides a reduced number of possible connections to the mobile communication units 9. The first communication node 2 is controlled such that it only enables a number of exactly two possible connections to two different mobile communication units, for instance. This is shown as an example in FIG. 4. When switching from the state shown in FIG. 2 to the second operating state, for example, the communication to one of the connected mobile communication units is interrupted. A comparison of FIGS. 2 to 4 shows that there is now another time interval that is not blocked by communication with a mobile communication unit and consequently more time is available for detecting the radio signal 51 emitted by one of the tire condition sensors 31 to 34.

Unlike as in the first operating state, in the second operating state the first communication node 2 is configured such that it detects the radio signal 51 emitted by one of the tire condition sensors 31 to 34 with which the availability of the respective tire condition sensor 31 to 34 is announced. This means that the first communication node 2 switches to scanning mode and tries to detect an emitted radio signal 51 from one of the tire condition sensors 31 to 34 whenever it is not blocked by a connection to a mobile communication unit and does not emit an availability signal 61, 66, 67, 68.

Figure 4:
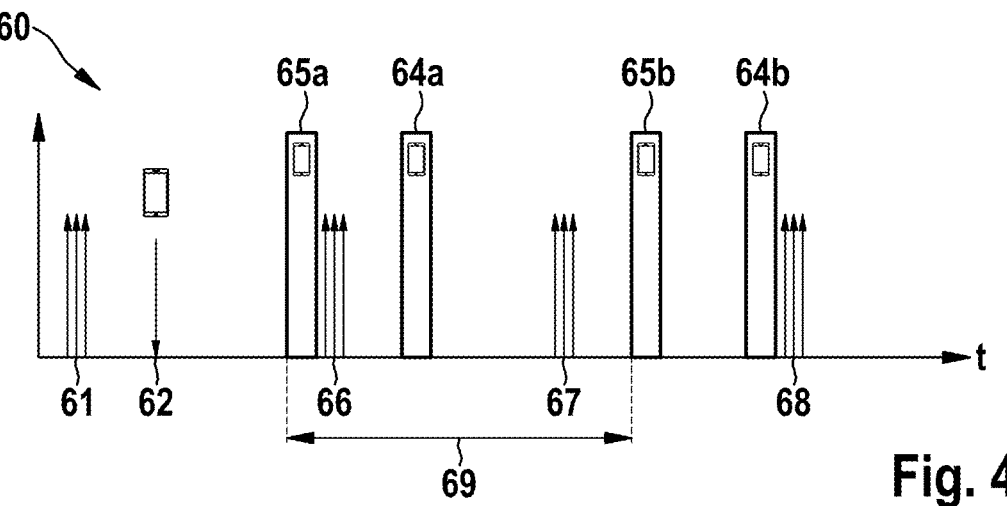
FIG. 4 shows a third diagram showing an example communication between a communication node and a plurality of mobile communication units in the second operating state, according to the present invention.

In FIG. 4, the first communication node 2 is in communication with two mobile communication units, wherein communication to the first mobile communication unit 9 is carried out in a first communication interval 63*a* and in a third communication interval 63*b*, and communication to the second mobile communication unit is carried out in a second communication interval 64*a* and a fourth communication interval 64*b*. Communication with each of the mobile communication units takes place in a periodic interval having a second cycle duration 69.

The first cycle duration 58 is preferably not equal to the second cycle duration 69. This avoids the radio signal 51 of the respective tire condition sensor 31 to 34 continuously being prevented from being received when the first communication interval 63*a* coincides with the radio signal 51 emitted by one of the tire condition sensors 31 to 34, because communication with the respective mobile communication unit always takes place at the same time.

If the first operating state is present, the radio signal 51 of all of the tire condition sensors 31 to 34 is rejected or ignored by all of the communication nodes 2 to 7. This means that communication between one of the communication nodes 2 to 7 and one of the tire condition sensors 31 to 34 is not possible in the first operating state. This is not a disadvantage, however, because the tire condition sensors 31 to 34 are often designed in such a way that they do not provide any usable data anyway when the vehicle is parked, i.e. when the first operating state is present. If the second operating state is present, the functionality of the other communication nodes 3 to 7, i.e. all of the communication nodes other than the first communication node 2, does not change. The radio signal 51 of the tire condition sensors 31 to 34 therefore continues to be rejected or ignored by the other communication nodes 3 to 7. The radio signals 51 emitted by the tire condition sensors 31 to 34 are detected by the first communication node 2, however, and a communication link to the respective emitting tire condition sensor 31 to 34 is established when the radio signal 51 is detected. Communication between the tire condition sensors 31 to 34 is thus necessarily routed through the first communication node 2.

It should be noted that, in the described embodiment, only a single communication node, namely the first communication node 2, is designed to establish a communication link to the tire condition sensors 31 to 34 in the second operating state. In alternative embodiments, any subset of the communication nodes 2 to 7 can be configured to do this.

It should be noted that, in BLE, the receivers (referred to here as anchors or communication nodes) have to take on different roles based on the BLE specification. To now ensure that the two systems function in parallel, a control mechanism which enables both functionalities is created.

The anchors are operated either in advertising mode or in connected mode (according to the BLE specification). To acquire the TPMS value, i.e. the measured value of the tire condition sensor, one or more communication nodes have to be operated in scanning mode as well. The application of the presented approach defines how which communication node should behave in order to enable the parallel function of the TPMS and another vehicle system.

The following is implemented to counteract a request for a dedicated receiver (communication node). Depending on the state of the vehicle: e.g. vehicle is driving, wheel speed>0 1/min, engine started, doors closed, driver detected in the driver seat, the system defines that the vehicle system has to receive the TPMS data. For this purpose, depending on the reception quality, a communication node or multiple communication nodes (the communication node(s) have to be evaluated in a development application for every vehicle project) are dynamically instructed to connect no more than two mobile communication units and to deactivate the "advertising" mode once the maximum number of connected devices has been reached.

A decision as to whether a communication node should now be actively used for the TPMS is preferably calculated using a random forest algorithm (machine learning).

In addition to the above written disclosure, explicit reference is made to the disclosure of FIGS. 1 through 4.

The invention claimed is:

1. A vehicle system for a vehicle, comprising:
a plurality of communication nodes, wherein each of the communication nodes is able to provide a connection to a plurality of mobile communication units, wherein the vehicle system is configured to:
detect whether the vehicle is in a first operating state or a second operating state; and
in response to detecting that the vehicle is in the second operating state, control a portion of the communication nodes such that each communication node belonging to the portion of the communication nodes:
provides a reduced number of possible connections to the mobile communication units than in the first operating state, and
is configured to detect a radio signal emitted by a tire condition sensor with which an availability of the tire condition sensor is announced and, upon detection of the radio signal, establish a communication connection to the tire condition sensor.

2. The vehicle system according to claim 1, wherein the vehicle system is further configured to, in response to detecting that the vehicle is in the first operating state, control all of the communication nodes to allow a respective predefined number of possible connection to the mobile communication units.

3. The vehicle system according to claim 1, wherein the vehicle system is further configured such that, in the first operating state, the radio signal of the tire condition sensor is rejected or ignored by all of the communication nodes.

4. The vehicle system according to claim 1, wherein the vehicle system is further configured such that, in the second operating state, the radio signal of the tire condition sensor is rejected or ignored by the communication nodes that do not belong to the portion of communication nodes.

5. The vehicle system according to claim 1, wherein the portion of communication nodes includes exactly one of the communication nodes.

6. The vehicle system according to claim 1, wherein:
(i) the radio signal emitted by the tire condition sensor is a radio signal emitted in a periodic interval having a first cycle duration, and/or
(ii) an established connection between one of the communication nodes from the portion of communication nodes and the mobile communication unit connected to the communication node is implemented in a periodic interval having a second cycle duration.

7. The vehicle system according to claim 6, wherein the first cycle duration is not equal to the second first cycle duration.

8. The vehicle system according to claim 6, wherein:
(i) the first operating state is present when the vehicle is parked, and/or
(ii) the second operating state is present when the vehicle is driving.

9. The vehicle system according to claim 6, wherein, in the second operating state, the provided reduced number of possible connections to the mobile communication units is a number of exactly two possible connections.

10. A method for operating a vehicle system for a vehicle which includes a plurality of communication nodes, wherein each of the communication nodes is able to provide a connection to a plurality of mobile communication units, the method comprising the following steps:

detecting whether the vehicle is in a first operating state or a second operating state; and in response to detecting that the vehicle is in the second operating state, controlling a portion of the communication nodes such that each communication node belonging to the portion of communication nodes:

provides a reduced number of possible connections to the mobile communication units than in the first operating state, and is configured to detect a radio signal emitted by a tire condition sensor with which the availability of the tire condition sensor is announced and, upon detection of the radio signal, establish a communication connection to the tire condition sensor.

* * * * *